United States Patent [19]
Abbadessa

[11] 3,811,081
[45] May 14, 1974

[54] PHOTOGRAPHIC APPARATUS WITH PRECISION MOTOR CONTROL

[75] Inventor: Joseph J. Abbadessa, Waltham, Mass.

[73] Assignee: Polaroid Corporation, Cambridge, Mass.

[22] Filed: Oct. 24, 1972

[21] Appl. No.: 299,667

[52] U.S. Cl. .............................. 318/375, 95/53 E
[51] Int. Cl. ............................................. H02p 3/12
[58] Field of Search .......... 318/273, 275, 364, 369, 318/375, 379, 466, 467, 162; 95/42, 53 E

[56] References Cited
UNITED STATES PATENTS
3,625,127  12/1971  Tsuda ................................. 95/53 E
3,715,964  2/1973  Tenkumo et al. ................ 95/53 E X Primary Examiner—Bernard A. Gilheany
Assistant Examiner—W. E. Duncanson, Jr.

[57] ABSTRACT

Photographic apparatus of a type having instrumentalities powered by select energizations of a dynamoelectric motor. The control system of the apparatus serves to selectively energize and de-energize this motor and, subsequent to such de-energization, impose a dynamic braking function upon it. An arrangement for imposing a dead zone separation between the de-energization of the motor and dynamic braking is shown as well as an arrangement whereby an overtravel of motor actuated switching is provided through precise regulation of the number of revolutions of the output of the motor during dynamic braking.

28 Claims, 11 Drawing Figures

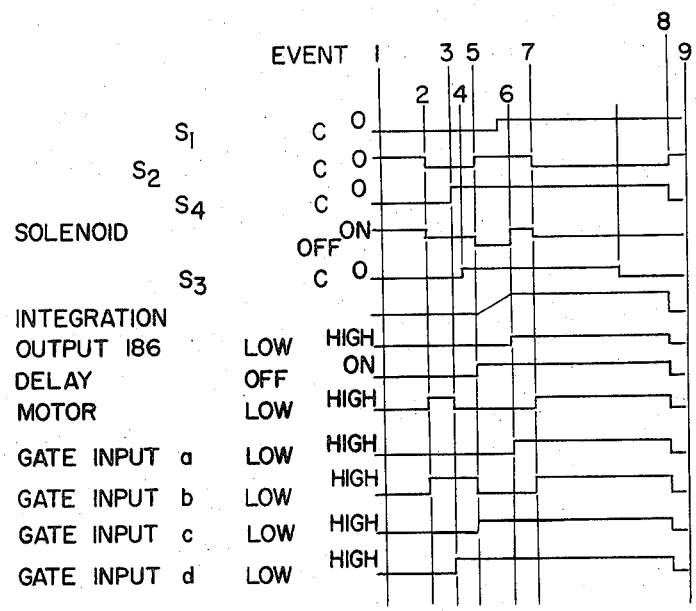

FIG. 7

| | | GATE A | | | | GATE B | | | GATE C | | | |
|---|---|---|---|---|---|---|---|---|---|---|---|---|
| | | SOLENOID POWER DR. | | | | SOL. POWER DOWN | | | MOTOR CONTROL | | | |
| EVENT SEQUENCE | | a | b | c | $t_1$ | a | c | $t_2$ | a | b | d | $t_3$ |
| 1 | START SWITCH CLOSED SOLENOID 80 ENERGIZED | 0 | 0 | 0 | 1 | 0 | 0 | 0 | 0 | 0 | 0 | 0 |
| 2 | SHUTTER CLOSES $S_2$ CLOSES, MOTOR ENERGIZED, POWER DOWN | 0 | 1 | 0 | 0 | 0 | 0 | 0 | 0 | 1 | 0 | 1 |
| 3 | REFLEX COMPONENT RISES, $S_4$ OPENS | 0 | 1 | 0 | 0 | 0 | 0 | 0 | 0 | 1 | 1 | 0 |
| 4 | $S_3$ OPENS, DELAY INTERVAL COMMENCES | 0 | 1 | 0 | 0 | 0 | 0 | 0 | 0 | 1 | 1 | 0 |
| 5 | COMMENCE EXPOSURE | 0 | 0 | 1 | 0 | 0 | 1 | 1 | 0 | 0 | 1 | 0 |
| 6 | COMPARATOR 188 THRESHOLD REACHED EXPOSURE TERMINATES | 1 | 0 | 1 | 1 | 1 | 1 | 0 | 1 | 0 | 1 | 0 |
| 7 | SHUTTER CLOSES, $S_2$ CLOSES. MOTOR ENERGIZED | 1 | 1 | 1 | 0 | 1 | 1 | 0 | 1 | 1 | 1 | 1 |
| 8 | MOTOR DE-ENERGIZED $S_4$ OVERTRAVEL BRAKE ACTIVATED | 0 | 1 | 0 | 0 | 0 | 0 | 0 | 0 | 1 | 0 | 0 |
| 9 | BRAKE DE-ACTIVATED | 0 | 0 | 0 | 0 | 0 | 0 | 0 | 0 | 0 | 0 | 0 |

FIG. 6

PHOTOGRAPHIC APPARATUS WITH PRECISION MOTOR CONTROL

BACKGROUND OF THE INVENTION

Highly automated photographic cameras which are controlled in accordance with a somewhat involved operational program have been proposed for introduction to the amateur photographic market. These automated cameras preferably incorporate a single lens reflex viewing feature in combination with automatic motorized processing and operational mode conversion. For instance, upon being actuated by an operator, the components of the camera automatically convert from a viewing-focusing mode orientation into an exposure mode orientation. Once the latter orientation is achieved, a photographic film unit is exposed under an automatically controlled exposure program. Following such exposure, the components of the camera are driven under electrical power into their original viewing-focusing mode orientation. As they reach these orientations, the camera is automatically shut down or prepared for a next ensuing photographic cycle.

Control over the components of the camera as they cycle from one operational phase to another is provided by a multiple gate logic circuit which operates in combination with the noted electric motor drive as well as with an electromagnetically actuated automatic shutter. The latter power devices both move instrumentalities and load drive springs and the like. A portion of the logic control system of the camera is provided by an assembly including a kinematic linkage operating in conjunction with a cycle phase control cam. Driven by a gear train powered by the noted electric motor, this cycle phase control cam preferably cycles through exactly one revolution in a course of a single photographic cycle. In a viewing mode of the camera, the cam and related kinematic linkage, serve to latch a reflex component in appropriate viewing position against the bias of a spring drive. Through the expedient of providing a very short energization of the motor, the cycle phase cam is rotated through an angle sufficient to permit the kinematic linkage to unlatch the reflex component, in turn, permitting the reflex component to be driven under spring drive into an exposure mode orientation.

As is described in U.S. Pat. by E. K. Shenk, No. 3,731,608, entitled "Reflex Camera with Motor Drive", when the reflex component leaves its viewing mode position, a kinematic linkage serves to actuate a switch or transducer monitor representing an electrical-mechanical interface within the control system of the camera. Such a switch may be utilized to activate timing devices or to provide necessary alignment signals for inputs of various gates within a control circuit. Following an interval of exposure and closure of the shutter mechanism of the camera, the noted motor again is energized to drive the gear train as well as the phase control cam and associated kinematic linkage. This second energization and gear drive provides power for carrying out various operational events including the movement of an exposed film unit through a processing station as well as for returning reflex components and the like to initial viewing mode orientations.

As the reflex component reaches its seated viewing position and various other instrumentalities of the camera are driven into their viewing mode orientations, the kinematic linkage again actuates or moves the contact leaves of the monitoring switch into their initial orientation. When the switch contact thus is made, the control circuit of the camera is signaled to shut down or return to a stand-by condition. This involves de-energizing the drive motor as well as realigning the inputs and outputs of all gate functions within the control circuit. A photographic cycle is completed as the cycle phase control cam returns to its initial or zero degree angular orientation representing the completion of one revolution.

As may be noted from the foregoing, an accurate regulation of the energization of the motor drive by the camera control system is highly important. Control error resulting in overly extended motor energization may lead to the development of unacceptable drift conditions over a given number of photographic cycles. Conversely, premature cut-off of motor drive may result in unstable monitor switch actuations. The latter condition may disrupt the necessary sense of signal input conditions to control circuit gates or the like. Further, such instability may occasion battery power supply leakage or drainage during the periods of camera nonuse or storage. Accurate and positive shutdown of the control system of the camera at the termination of a photographic cycle is required to assure reliability and, hence, practicality for applications in the amateur photographic field. The conttol system must be called upon to shut itself down with full reliability at the termination of each photographic cycle without recourse to manipulative steps on the part of the operator. The elimination of such extra operator manipulations is essential to the noted use of the camera under typical, practical conditions.

SUMMARY OF THE INVENTION

The present invention is addressed to a control system for automated photographic apparatus of a variety utilizing an electric motor drive output for powering various instrumentalities in a manner defining a photographic cycle. To assure the necessary accuracy of this motor drive, means are provided for uniquely dynamically braking the motor following the de-energization of the circuitry of the entire control system. This braking is carried out both in selectively time-delayed relationship with the noted de-energization and in a manner providing for a selective over-travel of transducer elements within the system.

In one important embodiment of the invention, the control system of the apparatus incorporates mechanical cycle logic means in the form of a cycle phase cam which is driven in response to energization of an electric motor. This cam serves to release and reset reflex components as well as to actuate a transducer in the form of a switch for the purpose of carrying out the de-energization of the motor. When actuated at the termination of a photographic cycle, this switch serves to provide a circuit shutdown signal. To assure positive actuation of this switch during and following circuit shutdown, dynamic braking automatically is carried out in a manner wherein a predetermined over-travel of the motor output is derived. At the termination of such over-travel, the dynamic braking network automatically quenches, the electronic components thereof assuming states prohibiting substantial camera battery leakage. The latter aspect of the invention is of particular importance in compact photographic cameras wherein battery energy sources are necessarily limited.

Another feature and object of the invention is to provide a control system for photographic apparatus of a variety incorporating various instrumentalities for carrying out a sequence of operational events defining a photographic cycle. An electric motor arrangement is energizable by the system to provide a rotating drive output to power a mechanical control which, in turn, causes the instrumentalities to carry out select ones of the operational events. The control system further includes a control arrangement for selectively energizing and subsequently de-energizing and dynamically braking the electric motor. This control means is operative to initiate dynamic braking in selectively time-delayed relationship with the de-energization of the motor. In one arrangement, the control means includes a sensing circuit which serves to follow and sense voltages witnessed within a dynamic braking circuit loop for purposes of turning off such dynamic braking circuit at a select point in time following the de-energization of the motor. In another arrangement, an R-C energizing network is utilized for purposes of activating the dynamic braking circuit at an appropriate point in time selected to provide for a predetermined motor over-travel under de-energized conditions. The control circuit of the invention further provides for selective dead-zone isolation of the switching of the circuit logic energizing and de-energizing the motor from the circuit logic serving to activate a dynamic brake circuit.

Other objects of the invention will in part be obvious and will in part appear hereinafter.

The invention accordingly comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 6 is a truth table or schedule of operational events performed by the control system of the camera of FIG. 1, showing in logic form the input and output status of multi-gate functions incorporated within the circuit of FIG. 5;

FIG. 7 is an energization status chart for various components of the circuit of FIG. 5 as they operate throughout a photographic cycle;

DETAILED DESCRIPTION

Figure 1:
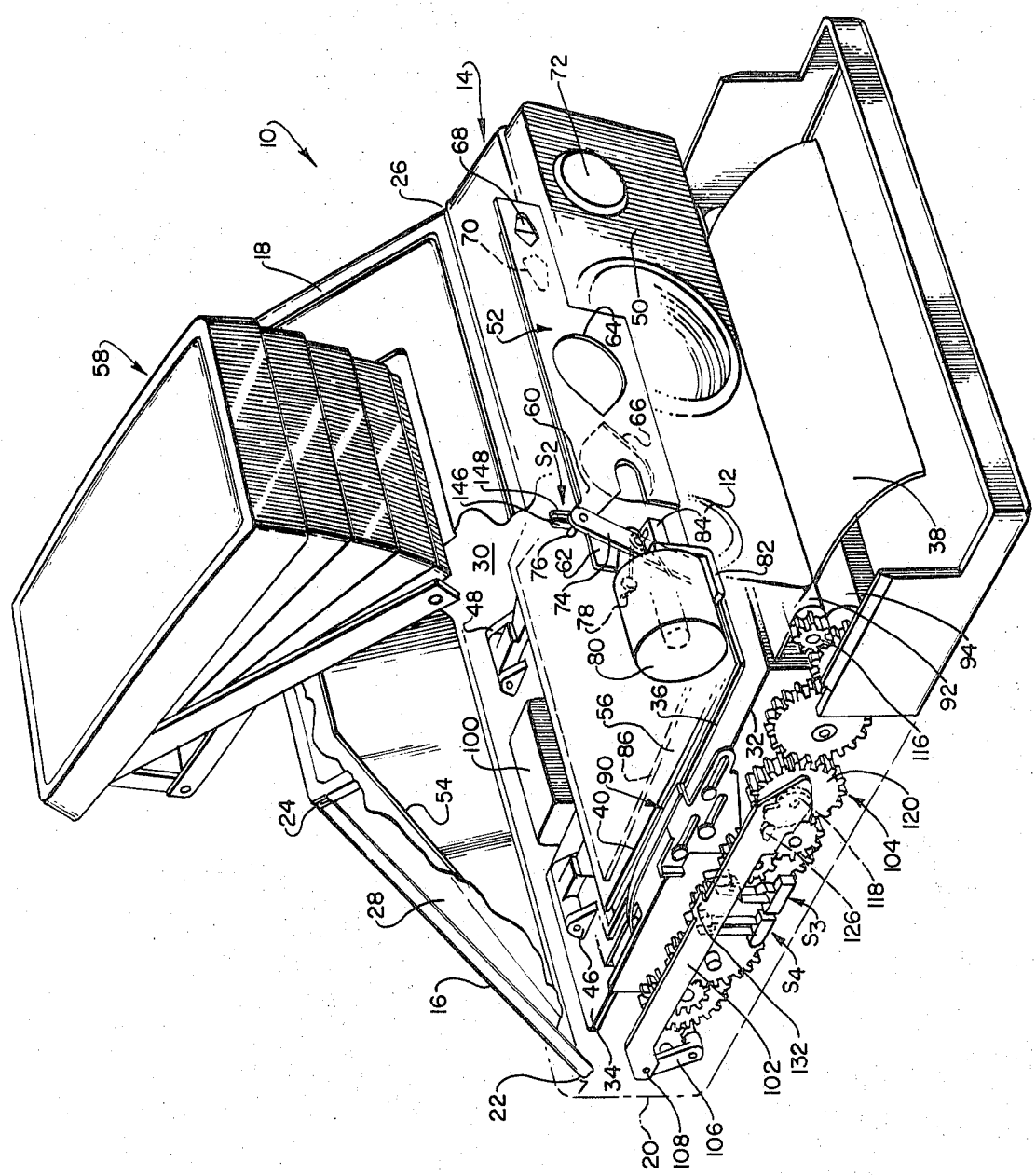
FIG. 1 is a pictorial view of a fully automatic handheld camera incorporating the control features of the instant invention, the view having portions shown in phantom or broken away to reveal internal structure.

Referring to FIG. 1, a fully automatic camera ideally incorporating the features of the instant invention is portrayed generally at 10. In the course of a single photographic cycle, the components of camera 10 are automatically re-arranged from positions defining a viewing and focusing mode to orientations establishing an exposure mode, following which the initial viewing and focusing mode is re-established and an exposed film unit is automatically processed. As a photographic cycle is terminated, the control system of the camera is shut down and dynamic braking of a motor is carried out. The operational events establishing these mode conversions are sequentially carried out in response to a momentary depression of a singular start button 12 mounted within the forward face of an exposure control housing 14. Exposure control housing 14 is the forwardmost of a grouping of mutually pivoted or articulated housing components including a rear wall 16, forward wall 18 and base portion 20. These components are pivotally associated with base portion 20 so as to be foldable thereinto in nesting fashion. When so folded from the erected configuration shown, the camera 10 assumes a thin and compact shape. The specific hinge connections providing for the articulated structure, while not being visible in the figure, are positioned at axes 22, 24, 26 and at the lower rear portion of exposure housing 14. When erected for making an exposure, rear wall 16, forward wall 18 and exposure housing 14 combine in conjunction with an opaque flexible bellows, a portion or fragment of which is illustrated at 28, to define an exposure chamber generally depicted at 30.

A film supply for camera 10 is provided by disposable film retaining cassette 32 positioned within base member 20. Cassette 32 is removably positioned against an inner frame, a portion of which is shown at 34. Formed having an upward facing rectangular film frame opening defined by a ridge 36, the cassette 32 retains a stacked assemblage of film units. The uppermost one of these film units is biased against the bottom of film frame ridge 36, a position coinciding with the exposure plane of camera 10.

In the course of a photographic cycle, the camera 10 operates in a modified reflex fashion in conjunction with the performance of film processing operations. The reflex operation of the camera provides a technique for converting the optical path thereof between viewwing and exposure operational viewing utilizing a reflex assembly including a somewhat planar reflex reflecting component 40. Shown in a position closely proximate its viewing-focusing mode orientation, the component 40 is movable during a photographic cycle between the illustrated position and a position against rear wall 16 representing its exposure operational mode orientation. Movement between the viewing-focusing and exposure mode positions is pivotal, the component 40 being coupled to a rearward portion of inner frame 34 by hinge connections 46 and 48.

Fabricated of a material opaque to light, reflex component 40 serves a dual function when in its viewing-focusing mode position. In particular, when at that position component 40 extends over and secures or seals the film frame opening defined by ridge 36 of cassette 32.

When oriented for viewing and focusing purposes, the components of camera 10 establish an optical path extending from a taking or objective lens assembly mounted within exposure housing 14 at 50, through an open exposure mechanism positioned generally at 52, (shown closed in the drawing) thence to a mirror 54 positioned at the inner side of rear wall 16 and thence to a viewing surface 56 mounted upon the upward surface of component 40. Viewing surface 56 is configured having a texture and optical design facilitating the focusing of the image of the scene to be photographed. This image may be viewed by the camera operator through a collapsible optical entrance assembly depicted generally at 58. A configuration suited for viewing surface 65 is described and claimed in U.S. Pat. No. 3,690,240 by Nathan Gold, entitled "Reflective Imaging Apparatus," while the assembly 58 and its related internal components are described in detail and claimed in a copending application for U.S. Pat. by James G. Baker filed December 15, 1970, entitled "Reflex Camera and Viewing Device," Ser. No. 98,356 and assigned in common herewith.

Looking more particularly to the exposure mechanism shown generally at 56, this mechanism is called upon to remain open in a manner establishing an aperture of maximum available size during the viewing-focusing operations of the camera. Described in detail in U.S. Pat. No. 3,641,889 by V. K. Eloranta, mechanism 52 is seen to comprise two blades or elements 60 and 62 which slidably ride across housing 14 in a track (not shown). Each blade, 60 and 62, is formed having a teardrop-shaped aperture opening shown respectively at 64 and 66. Additionally, the blades are formed having secondary openings shown, respectively, at 68 and 70 which move cooperatively before the light detecting elements of a photosensing network positioned behind an entrance optical assembly 72.

Openings 64 and 66 of respective blades 60 and 62 are mounted for movement across the optical path of the camera 10 as it is established at taking lens assembly 50. Depending upon the position of blades 60 and 62, openings 64 and 66 symmetrically overlap to define selectively varying aperture sizes. Secondary openings 68 and 70 are configured in correspondence with the contours of respective openings 64 and 66. These openings also move in mutual symmetry over the optical path of the light sensing network.

Blades 60 and 62 move in the noted mutual symmetry as a result of their connection with a walking beam as shown at 74. Walking beam 74 is mounted within housing 14 so as to be rotatable about its midpoint and is connected at each tip through a pin and slot arrangement to a respective one of blades 60 and 62. One such connection, that between blade 60 and walking beam 74 is shown at 76. Thus interconnected, blades 60 and 62 move simultaneously and in correspondence with each other to define a continuous progression of symmetrically configured variable aperture openings over the optical path of camera 10 and the optical path of the light sensing network entrance optics 72.

Walking beam 74 is biased for rotation toward a terminal position defining widest available aperture by a spring as at 78. Movement of blades 60 and 62 from their normally open orientation permitting viewing and focusing into the closed orientation blocking the passage of light along the optical path of camera 10, as shown in FIG. 1, is carried out by a solenoid 80 mounted within exposure housing 14 upon a bracket as at 82. Solenoid 80 is designed having an internally disposed cylindrical plunger or armature which retracts inwardly within an excitation winding upon energization thereof. This plunger is connected to walking beam 74 by a comb-shaped connector 84 slidably fitted over a pin extending from beam 74.

When solenoid 80 is energized to retract its plunger as well as connector 84, walking beam 74 is rotated rapidly against the bias of spring 78 to move blades 60 and 62 into the fully closed orientation shown in FIG. 1. Such energization takes place both during operational mode conversion procedures as well as to terminate an exposure through taking lens 50.

During a typical photographic cycle, following viewing and focusing procedures, solenoid 80 is energized to cause blades 60 and 62 to close for a period of time sufficient for the optical path of camera 10 to convert to an exposure mode orientation. Once this exposure mode orientation is achieved, solenoid 80 is de-energized to permit spring 78 to drive beam 74 and, consequently, blades 60 and 62 toward the noted open terminal position. At such time as an appropriate exposure valuation has been reached, solenoid 80 again is energized to rotate walking beam 74 and rapidly drive blades 60 and 62 to a fully closed orientation. This closed orientation is maintained for a period sufficient for the components of the camera to reassume their viewing-focusing mode orientations as well as to process an exposed film unit.

Conversion of the optical path to the exposure mode is carried out by pivoting reflex component 40 about hinges 46 and 48 away from its position covering the exposure plane of the camera and into a position against rear wall 16. When such position is reached, a mirror 86 formed on the inward facing side of reflex component 40 is positioned within the optical path of the camera and the exposure plane positioned just beneath cassette ridge 36 is uncovered for exposure. The resultant optical path of the camera then extends from taking lens assembly 50 to mirror 86, thence to an uppermost film unit positioned at the underside of ridge 36. Following the energization of solenoid 80 to terminate an exposure interval, reflex component 40 is motor driven to its viewing-focusing position, securing the exposure plane of the camera, and an exposed film unit as shown at 38 is moved forwardly by a pick mechanism shown generally at 90 into the bite of processing rolls 92 and 94. A mechanism as at 90 is described in a copending application for U.S. Pat. by I. Blinow and R. D. Leduc, Ser. No. 141,553 entitled "Film Advancing Apparatus", filed May 10, 1971 and assigned in common herewith, while film unit 38 is described in detail in a U.S. Pat. by E. H. Land, No. 3,672,890 entitled "Novel Photographic Products and Processes". Film units as at 38 are structured to contain a processing fluid which is spread therewithin to cause the formation of a visible positive image.

Looking now to the control arrangement providing for the mode conversion operations carried out during a photographic cycle, while the instrumentalities of camera 10 are oriented to establish a viewing-focusing operational mode, spring 78 holds blades 60 and 62 in a terminal position defining maximum aperture width. Additionally, reflex component 40 is held in its light securing position over the exposure plane of the camera by an actuator system. This system operates through an interaction of drive springs (not shown) normally biasing component 40 into its elevated position with a motor driven latching arrangement. Described in detail in U.S. Pat. No. 3,714,879 the actuator system utilizes the output of a motor 100 to regulate a mechanical control linkage including a ram 102 by selectively driving an elongate, thin gear train, certain components of which are shown generally at 104 extending along one side of camera 10.

Figure 2:
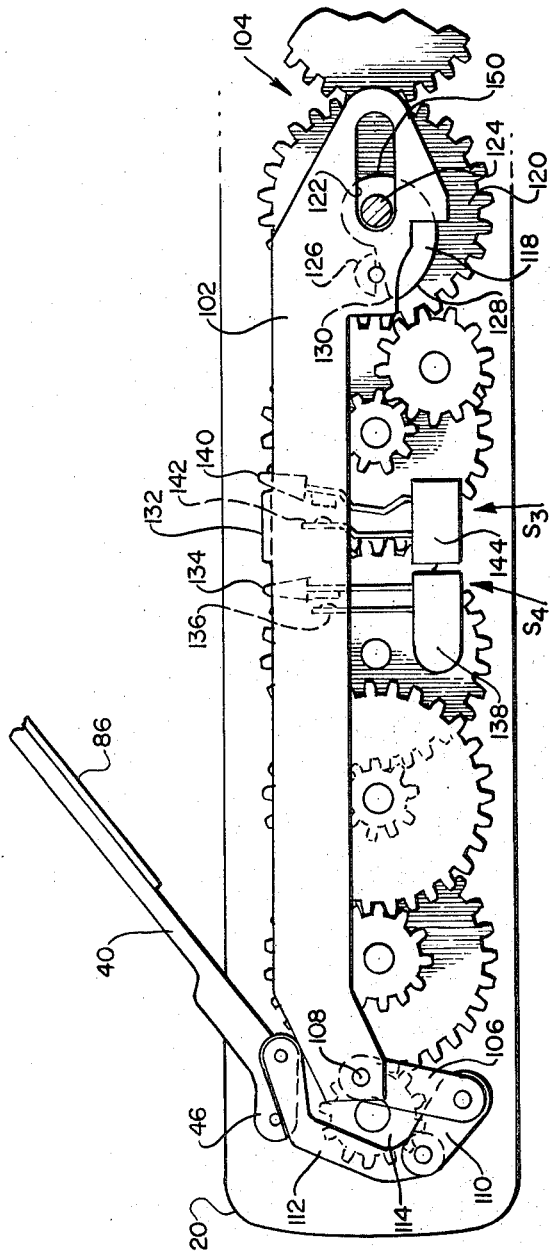
FIG. 2 is a fragmentary left side elevational view of the camera of FIG. 1.
Figure 3:
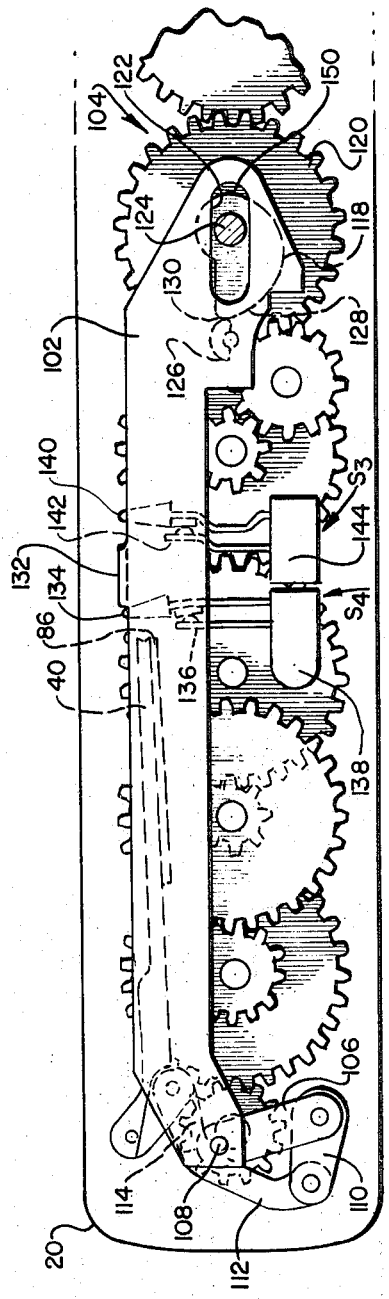
FIG. 3 is a fragmentary left side elevational view of the camera of FIG. 1 showing components thereof in a viewing mode orientation.

Referring additionally to FIGS. 2 and 3, ram 102 is interconnected with reflex component 40 through a multiple component linkage as well as an overriding spring connection. Described in detail in the above-noted Pat. No. 3,714,879, this multiple component linkage includes, inter alia, a bell crank 106 connected to ram 102 at pin connection 108, as well as articulated links 110 and 112. With the arrangement, ram 102 is driven from the same spring bias elevating reflex component 40 into its exposure mode orientation. For instance, as the component 40 is elevated, ram 102 is driven from bell crank 106 in a manner wherein its rectilinear motion follows or corresponds with the pivotal movement of reflex component 40.

Gear train 104 is powered from motor 100 and receives input drive therefrom through drive pinion 114. Drive input from pinion 114 serves to power two reduction ratio circuits within gear train 104, one such circuit leading to drive pinion 116 of the processing station of the camera including rolls 92 and 94. The other reduction ratio circuit of gear train 104 terminates in a cycle phase control cam 118 connected to a spur gear 120 of the noted other reduction ratio circuit. This circuit is so designed as to cause gear 120 and, consequently, cam 118, to rotate through one revolution during the course of a single photographic cycle.

Ram 102 is supported at its forwardmost end by an elongate slot 122 extending over the axle 124 of gear 120. The forward end of ram 102 also supports an inwardly extending cam follower 126 which operates in conjunction with the control surfaces of cycle phase control cam 118. These control surfaces are designed so that ram 102 may serve the functions both as a latch for retaining and selectively releasing reflex component 40 from its viewing-focusing position as well as a cocking arrangement for urging component 40 from its exposure position to the noted viewing-focusing position. Looking to FIG. 3, the components of gear train 104, ram 102 and cycle phase control cam 118 are shown as they are oriented when cam 10 is in a viewing-focusing mode of operation. Biased forwardly by the elevating drive springs for component 40, ram 102 is urged through follower 126 toward a high dwell portion 128 of cam 118. It will be apparent that only a minor rotation of cam 118 will present a sudden return profile portion 130 against follower 126. Accordingly, a very brief energization of motor 100 near the commencement of a photographic cycle will cause gear train 104 to rotate cam 118 such that follower 126 of ram 102 confronts the sudden return profile 130 of cam 118 to release ram 102 for forward movement and, as a consequence, release reflex component 40 for elevation to its exposure position against rear wall 16. The latter orientation is illustrated in FIG. 2.

During the noted movement for converting the instrumentalities of the camera between a viewing-focusing mode and exposure mode orientations, an inwardly extending tab 132 releases from engagement with the insulative cap of a resilient leaf 134 of a switch identified generally as $S_4$. Switch $S_4$ additionally includes a resilient leaf 136 which is supported along with leaf 134 from an insulative base 138 fixed within base member 20. The respective locations and orientations of leaf 134 and tab 132 are such that switch $S_4$ is opened in correspondence with the initial movement of component 40 from its viewing-focusing position. As reflex component 40 somewhat closely approaches its seated position against rear wall 16, tab 132 contacts the insulative cap of a leaf 140 of another switch identified generally as $S_3$ (See FIG. 2). Leaf 140 normally is in contact with an oppositely disposed leaf 142 of switch $S_3$ and is supported along therewith from an insulative base 144 also fixed within base member 20.

Returning to FIG. 1, during conversion of the instrumentalities of camera 10 from a viewing-focusing mode orientation into an exposure mode orientation, the optical path of the camera through taking lens assembly 50 is blocked by exposure mechanism 52, solenoid 80 remaining in an excited state to hold walking beam 74 in the requisite closing position against the bias of spring 78. When walking beam 74 is so positioned, another switch, identified generally as $S_2$ located within housing 14 is actuated to a closed position. Switch $S_2$ is formed having resilient leaves 146 and 148 which are supported within housing 14. The switch is so positioned that when walking beam 74 is rotated to close blades 60 and 62, an insulated extension of pin 76 urges leaf 146 into contact with leaf 148.

When reflex component 40 reaches its exposure mode positioned against rear wall 16, exposure mode performance ensues with the de-energization of solenoid 80 to release walking beam 74 for rotation under the bias of spring 78. As walking beam 74 rotates, a progressively enlarging aperture opening is defined by blades 60 and 62 both across the optical path of taking lens assembly 50 and the entrance optics for the light sensing circuit of the camera as shown at 72. An exposure is terminated with the re-energization of solenoid 80 to block the optical path, which energization continues until such time as the photographic cycle has terminated.

With exposure chamber 30 secured by the closure of blades 60 and 62, motor 100 is re-energized to again drive gear train 104, thereby rotating cam 118. Looking additionally to FIGS. 2 and 3, with this second rotation of cam 118, contact is asserted between a rising profile portion 150 of the surface thereof and follower 126 to drive ram 102 rearwardly and, in turn, cock reflex component 40 into its viewing-focusing mode position. Simultaneously with this cocking activity, the second reduction circuit within gear train 104 functions to drive pinion 116 of processing rolls 92 and 94 as well as to actuate pick mechanism 90. Accordingly, the uppermost film unit 38 is removed from cassette 32 to be urged into the bite of rolls 92 and 94. As film unit 38 is processed, and reflex component 40 closely approaches its seated viewing-focusing orientation, tab 132 reasserts contact with the insulative cap 134 of switch S₄.

As switch S₄ closes, motor 100 is de-energized and dynamically braked to halt rotation of cam 118 as the high dwell portion 128 thereof moves into contact with follower 126. It is important to assure the full closure of contact 134 against contact 138 of switch S₄. Accordingly, after the de-energization of motor 100, a dynamic braking feature of the invention permits a controlled continued movement of cam 118 to provide a slight overtravel at the output of motor 100 assuring the closure of switch S₄. Closure of switch S₄ also serves to signal the camera circuitry to shut down, thereby de-energizing the excitation winding of solenoid 80 to permit spring 78 to drive walking bear 74, in turn, causing blades 60 and 62 to assume a terminal position exhibiting an aperture opening of maximum width. The instrumentalities of camera 10 have now reassumed their original viewing-focusing mode orientations.

Referring to FIGS. 4, 5, 6 and 7, a descriptive chart as well as a schematic diagram for a control circuit along with related truth tables and energization state diagrams serving to carry out the operational events discussed above are displayed. The circuit of FIG. 5 includes a series of multifunction gates designated A-C. The inputs and outputs for these gates are depicted in Boolean enumeration in the truth table represented in FIG. 6 as well as by energization state curves in FIG. 7. For purposes of understanding the tabulations within these figures, as well as to facilitate the description to follow, when the inputs or outputs of the listed components are at ground reference potential, they are referred to as "low" and, additionally, such input or output is digitally identified as "0". Conversely, when these inputs and outputs assume or approach the voltage status of the power supply of the control circuit, they are referred to as being "high" and are given the binary designation "1". The operational events as tabulated and numbered in FIG. 6 are again identified by the same numeration in the corresponding energization state diagram of FIG. 7. In the latter diagram, the status of swtiches S₁ – S₄ of the circuit as well as the energization states of various components thereof are shown in comparitive time scale fashion. It may be noted further that certain of the gate input terminals receive common signals. These common terminals are identified by the letters "a-d". Additionally, the outputs of GATES A-C are identified, respectively, by the letters "t₁ – t₃". Where solid state components such as transistors are forwardly biased, they may be described as being "on" or "activated". Additionally, where the junctions of such components are not rendered conductive, they are referred to as being "off" or "deactivated".

Figure 5:
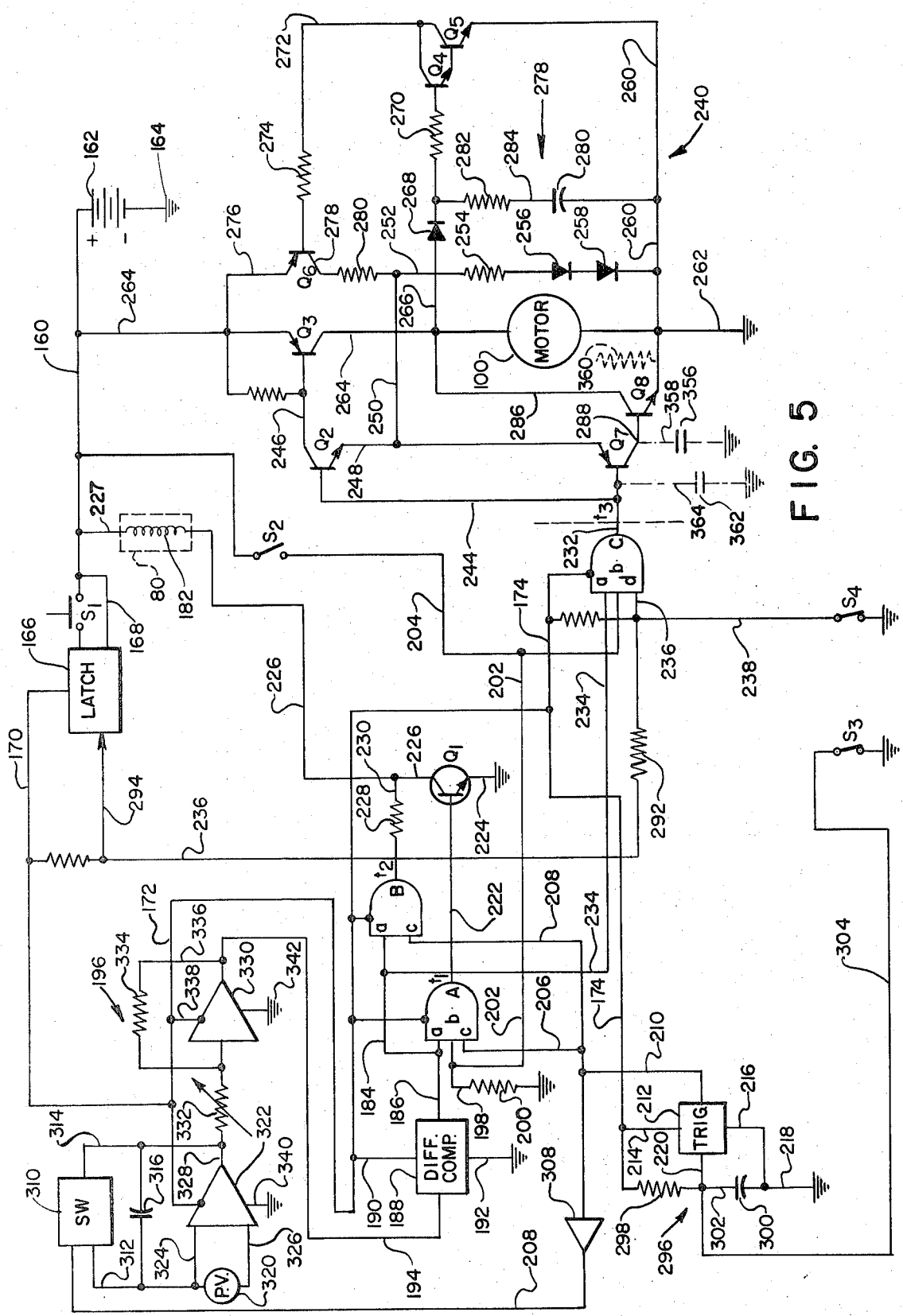
FIG. 5 is a schematic diagram of a control circuit as used in conjunction with the control system of the camera of FIG. 1.

Looking to FIGS. 5, 6 and 7, the circuit arrangement for controlling camera 10 under ambient lighting conditions is illustrated. As noted earlier, a photographic cycle is commenced with the depression of start button 12. This depression serves to close a switch designated S₁ in FIG. 5. Switch S₁ is connected with a primary power line 160 which will be seen to activate a latch driver. Line 160 also is connected with the positive terminal of a battery 162. The opposite terminal of battery 162 is connected by line 164 to ground. Thus connected, primary power line 160 serves to energize or drive a latching network depicted functionally at block 166. Described in detail and claimed in a copending application for U.S. patent by J. P. Burgarella, P. P. Carcia and R. C. Kee, Ser. No. 213,317, filed Dec. 27, 1971 and assigned in common herewith, network 166 operates under two energization states. The first of these states permits the operator of camera 10 to abort a photographic cycle until such time as switch S₄ is opened. Following the opening of switch S₄, a second energization state at network 166 provides for continuous energization of the entire circuit even though the contacts of switch S₁ are separated.

The output of latching network 166 is present at a power distribution line 170 which, in turn, is connected to a branch power line 172. Branch power line 172 is connected to a second branch power line 174 and these two lines serve to power and assert initial control conditions over the various gates and components within the entire circuit. These conditions, as they exist at the commencement of a photographic cycle, are tabulated at Event No. 1 of FIG. 6, while the initial viewing-focusing mode orientation of the pertinent instrumentalities of camera 10 are shown at blocks 176 and 178 of FIG. 4.

As described in connection with function block 180 of FIG. 4, the initial operational event is that of energizing the excitation winding 182 of solenoid 80. This is carried out by asserting select input conditions to the input terminals of multifunction GATES - and B. Looking to these inputs, input terminals "a", commonly connected by line 184, exhibit an initial "low" status by virtue of their connection through line 184 to the output line 186 of a differential comparator 188. Comparator 188 may be of conventional design, operating as a non-inverting amplifier. Energized from branch power line 172 through line 190 and coupled to ground through line 192, the output at line 186 of comparator 188 remains "low" until a signal is received at its input line 194 which is at least equal to a predetermined triggering reference or threshold level. Upon receipt of such signal, the output at line 186 assumes a "high" status. Such input at line 194 is derived as a control signal generated from an exposure control network designated generally as 196.

Gate input terminal "b" of GATE A evidences a "low" state by virtue of its connection through line 198 and pull-down resistor 200 to ground. Additionally, this "low" status extends through the connection of line 198 through lines 202 and 204 to switch S₂. As described earlier in connection with FIG. 1, switch S₂ remains open unitl such time as exposure mechanism blades 60 and 62 are fully closed. At such time as switch S₂ is closed, line 204 is energized from primary power line 160.

Gate input terminal "c" of GATE A is coupled through lines 206 and 208 to the corresponding common input terminal of GATE B. The initial "low" status of these inputs is derived as a result of the connection of line 208 through line 210 to the output of a Schmitt trigger 212. Schmitt trigger 212 may be of conventional design, having a normally non-conductive input stage and a normally conductive output stage. Energized from branch power line 174 through line 214 and coupled to ground through lines 216 and 218, the output of trigger 212 remains "low" until a signal is received at its input at line 220 which is at least equal to a predetermined reference level. Upon receipt of such signal, the output at line 210 assumes a "high" status. Accordingly, common gate input "c" remains "low" pending the triggering of Schmitt trigger 212.

With the assertion of the above-described input logic, the resultant initial output "$t_1$" of GATE A present at line 222 is "high" and is imposed upon the base of an NPN transistor $Q_1$. The emitter of transistor $Q_1$ is coupled along line 224 to ground, while its collector is connected to line 226. Line 226, in turn, connects to the excitation winding 182 of solenoid 80 which, in turn, is connected to primary power line 160 through line 227. Solenoid 80 is designated functionally in FIG. 5 by a dashed boundry. The "high" status at line 222 serves to forward bias the base-emitter junction of transistor $Q_1$, thereby energizing winding 182 to cause exposure mechanism 52 to block the optical path of camera 10. The output "$t_2$" of GATE B is "low" at the commencement of a photographic cycle and is coupled through a current limiting resistor 228 and line 230 to line 226. GATE B serves a powering-down function wherein solenoid 80 is energized at a lower current level when the plunger thereof gains its fully retracted position. To carry this out, GATE B diverts solenoid energizing current through limiting resistor 228. When transistor $Q_1$ is forward biased, however, this diversion through resistor 228 is insignificant. The powering-down feature of the control system is described and claimed in a copending application for U.S. patent by C. H. Biber and E. K. Shenk entitled "Photographic Apparatus with Solenoid Powered Instrumentalities", Ser. No. 163,948 filed July 19, 1971 and assigned in common herewith.

Solenoid 80 being energized, blades 60 and 62 are driven to their fully closed position and when this position is reached, contacts 146 and 148 of switch $S_2$ are closed (FIG. 1). As noted at Event No. 2 of FIGS. 6 and 7, the closure of switch $S_2$ alters the "b" input terminal state at line 202 from a "low" to a "high". As a consequence, output "$t_1$" of GATE A converts to a "low" state to remove the forward bias at transistor $Q_1$. Energization of winding 182 continues under the noted powering-down operation of GATE B. This input terminal "b" alteration also changes the output "$t_3$" of GATE C. While Event No. 1 is being carried out, the output "$t_3$" at line 232 is "low". This "low" output is established as a result of a "low" present at line 234 and introduced to input terminal "a". Line 234 is connected to line 184, the latter line providing a common coupling of the corresponding inputs "a" of GATES A and B. Gate input terminal "d" of GATE C remains "low" in consequence of its connection through lines 236, 238 and closed switch $S_4$ to ground. Input terminal "b", being coupled to line 204, alters from a "low" state to a "high" state upon the closure of switch $S_2$. The resultant "high" output "$t_3$" of GATE C, when introduced at line 232, signals a motor control function depicted generally at 240 to energize motor 100 as depicted at function block 242 of FIG. 4.

Motor control circuit 240 is formed including, inter alia, two switching subcircuits, one being a network serving to energize motor 100 and the other being a braking loop switching circuit. These two switching networks or circuits must operate in mutually isolated fashion to avoid damage to the entire system as might be occasioned by their simultaneous activation. More particularly, the switching circuit which is utilized to energize and de-energize motor 100 from the battery source should evidence a very rapid reaction characteristic, for instance about ten microseconds, while the switching components or the braking loop preferably should evidence a reaction time much slower, for instance about 20 microseconds. The time differential between these switching reaction times represents a dead zone separation of a timing variety. The two switching functions also should be isolated in dead zone separation fashion from the standpoint of threshold switching voltages.

With the alteration of the output of GATE C to a "high" status, an NPN transistor $Q_2$ is forward biased into conduction. The base of transistor $Q_2$ is connected by line 244 to output line 232, while its collector is connected through line 246 to the base of a PNP transistor $Q_3$. The emitter electrode of transistor $Q_2$ is connected through reference level line 250, line 252, resistor 254, diodes 256 and 258, line 260 and line 262 to ground. Thus forward biased, transistor $Q_2$ serves to draw transistor $Q_3$ on or into conduction, thereby activating line 264 to power motor 100 from primary power line 160. Note that motor 100 is connected within line 264 between line 260 and line 160.

Thus energized, motor 100 commences to drive gear train 104 and effect the commencement of rotation of cycle phase cam 118. As this energization is carried out, the "high" voltage signal applied to the motor from line 264 is also asserted through line 266, blocking diode 268 and bias resistor 270 to the base of an NPN transistor $Q_4$. Transistor $Q_4$ is coupled with an NPN transistor $Q_5$ in Darlington fashion, the emitter and collector electrode of transistor $Q_5$ being coupled in series between lines 260 and 272. Line 272, in turn, is coupled through bias resistor 274 to the base of a PNP transistor $Q_6$. When line 272 is activated by the forward biasing of paired transistors $Q_4$ and $Q_5$ at the energization of motor 100, transistor $Q_6$ is forward biased. The emitter of transistor $Q_6$ is coupled through line 276 to line 264, while its collector is connected through line 278 and resistor 280 to line 250.

The forward biasing of transistor $Q_3$ also serves to charge an R-C storage network 278. Network 278 comprises a capacitor 280 and resistor 282 positioned within line 284. Line 284, in turn, is connected between lines 260 and 266. Thus configured, capacitor 280 is charged through resistor 282 in correspondence with the energization of motor 100. The time constant for network 278, for charging purposes, is selected as relatively short in view of the correspondingly short period of energization of motor 100 at the commencement of a photographic cycle.

As illustrated in connection with function block 280 of FIG. 4, energization of motor 100 serves to rotate cycle phase control cam 118 such that its control surface sudden return portion 130 moves across cam follower 126 of ram 102. Reflex component 40 is driven upwardly towards rear wall 16 while ram 102 moves forwardly in simultaneous correspondence. At the commencement of such movement, tab 132 releases from engagement with the insulative cap of spring leaf 134 of switch $S_4$ to develop a signal condition providing for the de-energization of the motor, as shown in function block 282, as well as activation of a dynamic brake loop network, as shown in block 284.

Returning to FIGS. 5-7, as shown at Event No. 3, the opening of switch $S_4$ alters the status of input terminal "d" of GATE C to a "high" condition and the resultant output "$t_3$" of the gate becomes "low".

The braking operation of circuit 240 commences only following the de-energization of motor 100 through the turning off of transistors $Q_2$ and $Q_3$ as is occasioned with the alteration of output "$t_3$" from a "high" to a "low" state. The presence of this "low" output state permits a PNP transistor $Q_7$ to be drawn on into conduction. In this regard, the base of transistor $Q_7$ is connected with output line 232, while its emitter electrode is connected through lines 248, 250, resistor 280, and line 278 to the collector of forwardly biased transistor $Q_6$. Current continues to be supplied through lines 250 and 248 to transistor $Q_7$ and this current is sustained by virtue of the maintenance of a forward bias at transistor $Q_6$. Transistor $Q_6$ remains on as a result of the discharge of capacitor 280 of storage network 278 through resistors 282, 270 and paired transistors $Q_4$ and $Q_5$.

The collector of transistor $Q_7$ is connected along line 284 to the base of an NPN transistor $Q_8$. The emitter and collector electrodes of transistor $Q_8$ are coupled within a brake loop line 286, such that when transistor $Q_8$ saturates, the plus side of motor 100 is effectively grounded, thereby asserting a dynamic brake. Representing the final switch in the braking network of motor control function 240, transistor $Q_8$ remains saturated until such time as the discharge of capacitor 280 decays to a level wherein paired transistors $Q_4$ and $Q_5$ are no longer forwardly biased. Accordingly, when this forward bias is removed, transistor $Q_6$ is turned off, to in turn, remove the power supply for transistor $Q_7$ which, in turn, removes the forward bias at transistor $Q_8$.

Because GATE C output "$t_3$" may rapidly convert to a "low" state, for instance in less than two microseconds, it is imperative that the braking function be activated only following the de-energization of motor 100 through the removal of forward bias at transistors $Q_2$ and $Q_3$. Should such de-energization be delayed, a highly harmful simultaneous energization of both the braking network and the energization network of motor control function 240 might ensure. As labeled between function blocks 282 and 284, control function 240 provides for a dead zone separation of these switching features. As one technique of such separation, threshold limitations are imposed upon each of the switching functions such that braking can only be carried out when the logic output "$t_3$" at the base input to transistor $Q_7$ drops below, for instance, about 0.7 volts. Conversely, energization of motor 100 can be carried out when that logic signal as applied to the base of transistor $Q_2$ is above about, for instance, 2.1 volts. This voltage separation is assured through the use of a reference network including divider resistors 280 and 254 and diodes 256 and 258 located within line 252. This reference network is coupled by reference line 250 to line 248, interconnecting the emitter electrodes of respective transistors $Q_2$ and $Q_7$. Assuming the presence of the above-noted voltage threshold levels, where line 250 is held at about a 1.4 volt level, the base input to transistor $Q_7$ must drop to about 0.7 volts in order to effect its forward biasing. As a consequence, there is about a 1.4 volt dead zone separation of the operation of the energization switching and braking switching circuits of motor control function 240.

Now continuing with the photographic cycle, the opening of switch $S_4$ and resultant alteration of the status of input terminal "d" serves to signal latching network 166 to assume its second energization state which commits the control system to the completion of the photographic cycle. Connection between input line 236 and network 166 is made through resistor 292 and line 294.

When released, reflex component 40 moves toward an abutting contact with an inwardly disposed portion of rear wall 16. As component 40 closely approaches its exposure mode position, ram 102, acting through tab 132, opens the contacts of switch $S_3$. Represented as Event No. 4 of FIGS. 6 and 7 and illustrated at function block 294 of FIG. 4, the opening of switch $S_3$ serves to activate an R-C timing network identified generally at 296. Formed of a timing resistor 298 and a timing capacitor 300 coupled within line 302 between ground and branch power line 174, network 296 serves to delay the commencement of exposure regulation. This delay function is selected having a time constant sufficient to permit reflex component 40 to fully seat at its exposure position. Network 296 is activated upon removal of a shunt about capacitor 300 which is constituted by a line 304 connected, from a point intermediate capacitor 300 and resistor 298 to ground through switch $S_3$.

Following an appropriate time-out of network 296, a threshold signal is developed at input 220 of trigger 212, thereby altering its output at line 210 to a "high" status. This "high" state, as introduced from line 210 to lines 206 and 208, simultaneously alters the state of all common gate inputs "c" to a "high" status. Such alteration changes the output "$t_2$" of GATE B to a "high" state, thereby abruptly terminating current flow in line 226 with the consequence of de-energizing the excitation winding 182 of solenoid 80. With this de-energization, blades 60 and 62 of exposure mechanism 52 commence to open under the bias of spring 78. As blades 60 and 62 move from their blocking terminal positions, switch $S_2$ again opens.

In addition to effecting the de-energization of excitation winding 182, the signal change in line 208 also is introduced through an inverter 308 to activate an electronic switch shown generally at 310. Described in detail and claimed in a copending application for U.S. patent by E. K. Shenk, Ser. No. 213,289, entitled "Exposure Control System Encorporating Solid State Switching to Enable a Light Sensitive Network", filed Dec. 27, 1971 and assigned in common herewith, when triggered, switch 310 removes a shunt established by lines 312 and 314 across a timing capacitor 316. The removal of this shunt activates exposure control network 196, thereby providing the exposure of light integration feature shown as Event No. 5 in FIGS. 6 and 7 and illustrated at block 318 in FIG. 4.

Network 196 includes a photovoltaic cell 320, positioned within camera 10 behind openings 68 and 70 of exposure mechanism 52 and connected to the input of an operational, differential-type amplifier 322 by lines 324 and 326. Timing capacitor 316 is coupled within a feedback path between the output 328 of amplifier 322 and its input at line 324.

Described in greater detail in U.S. Pat. No. 3,620,143, the output of this light sensing arrangement at line 328 represents an integrated valuation of scene lighting as witnessed at the optical path of camera 10. This output is varied in accordance with the sensitometric properties of film being exposed by a second amplification stage 330. Amplification stage 330 operates in conjunction with a gain adjusting variable resistor 332 and a calibrating resistor 334, the latter being positioned within a feedback path line 336. The noted film speed and calibration adjustment of the output in 328 is described in greater detail in U.S. Pat. No. 3,641,891.

Note that power supplies for both amplifiers 322 and 330 are provided from branch power line 172 and line 338, while ground connections for the amplifiers, respectively, are provided through lines 340 and 342.

The adjusted output from network 196 is presented along line 194 to differential comparator 188. When the signal value at line 194 reaches the threshold or trigger level of comparator 188, the output thereof at line 186 converts from a "low" to a "high" state. This conversion is represented in FIGS. 6 and 7 as operational Event No. 6. As displayed in those Figures, the resultant "high" output at line 186 alters the status of common gate input terminal "a" to a corresponding "high" status. The resultant outputs of GATES A and B are converted. For instance, output "$t_1$" of GATE A is changed to a "high" status and output "$t_2$" of GATE B is changed to a "low" status. A "high" output at line 222 serves to forward bias the base-emitter junction of transistor $Q_1$, thereby energizing solenoid winding 182 from line 226, in turn, causing solenoid 80 to block the optical path of camera 10 by closing blades 60 and 62. This action, as is illustrated at a function block 344 of FIG. 4, terminates an exposure interval.

As switch $S_2$ is closed with the closure of exposure mechanism blades 60 and 62, the status of input terminals "b" to GATES A and C convert from a "low" to a "high" state.

Figure 4:
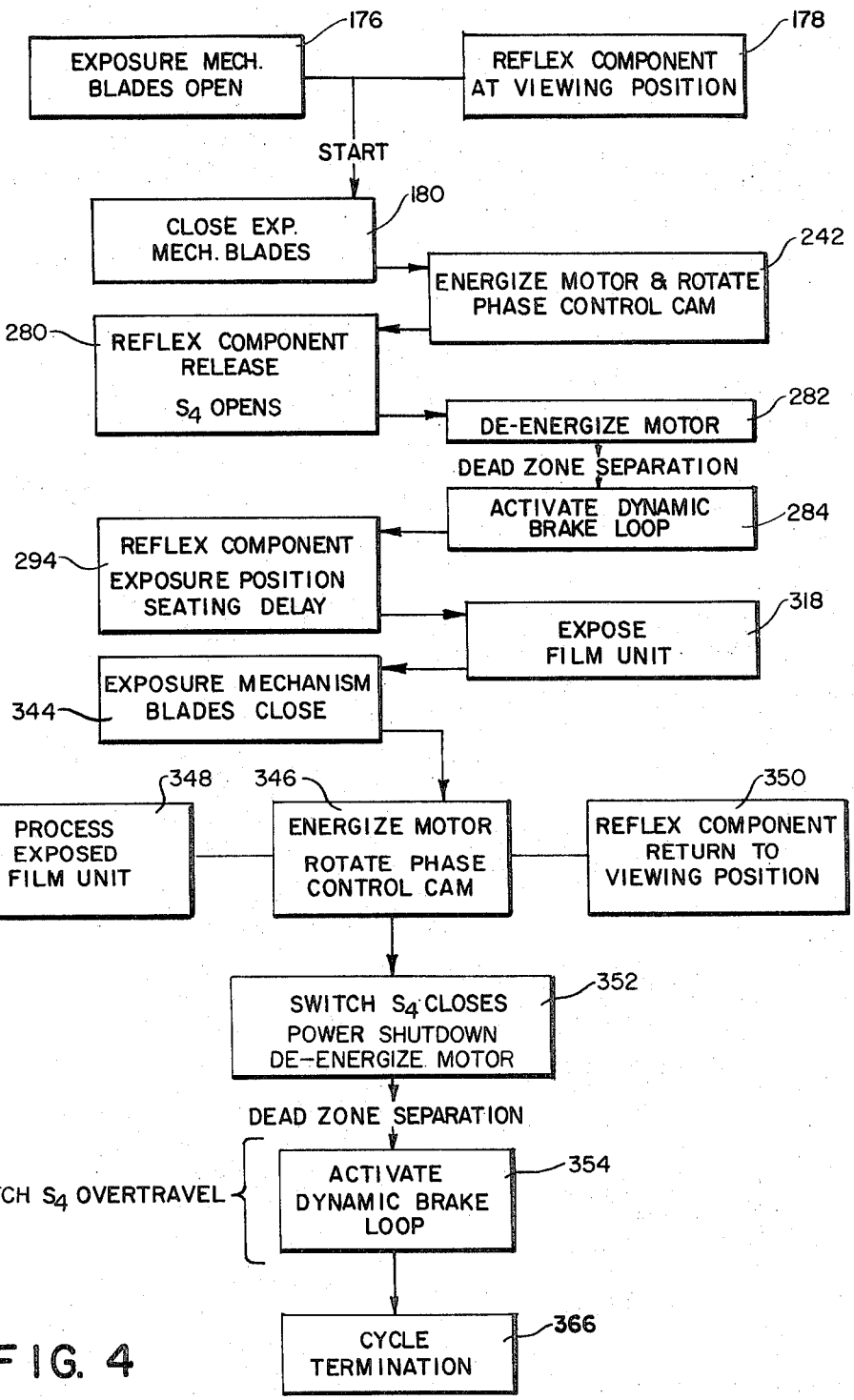
FIG. 4 is a block logic diagram showing the sequence of events occuring during a photographic cycle of the camera of FIG. 1.

As tabulated and displayed at Event No. 7 in FIGS. 6 and 7 and function blocks 346, 348 and 350 of FIG. 4, the latter input alteration changes the output "$t_3$" of GATE C to a "high" status, thereby again activating the motor 100 energization switching circuit of motor control function 240. As before, the "high" signal at output line 232 is introduced through line 244 to forward bias the base-emitter junction of transistor $Q_2$. As transistor $Q_2$ conducts, transistor $Q_3$ is drawn on to commence the energization of motor 100 along line 264. Simultaneously, paired transistors $Q_4$ and $Q_5$ are forward biased from line 266 and bias resistor 270. As paired transistors $Q_4$ and $Q_5$ conduct, transistor $Q_6$ is drawn into conduction to provide a voltage level adjustment providing a voltage-type dead zone separation between transistors $Q_2$ and $Q_7$. Additionally, storage network 278 is charged from line 266.

Thus energized, motor 100 rotates cycle phase cam 118 to drive ram 102 rearwardly by causing rising profile portion 150 of the control surface thereof to engage cam follower 126 (FIGS. 2 and 3). As ram 102 is driven rearwardly, reflex component 40 is returned to its viewing-focusing position. In the course of this movement, pick assembly 90 (FIG. 1) is actuated to draw a photographic unit 38 from cassette 32 and move its forward edge into the bit of rotating processing rolls 92 and 94 to process the unit and drive it from receiving chamber 30.

As in the earlier energization of solenoid 80, the alteration of the status of input terminals "b" at GATES A and C also serves to change the output "$t_1$" of GATE A to a "low" status thereby removing the forward bias at transistor $Q_1$. The earlier described power-down function performed by GATE B continues the energization of winding 182 at a lower current level.

As reflex component 40 is driven from its exposure position, switch $S_3$ is closed, thereby reactivating the shunt imposed by line 338 about timing capacitor 334. The output of the trigger 212 returns to a "low" status to, in turn, change the state of common input terminals "c" to a "low" status.

Looking additionally to FIG. 3, as reflex component 40 reaches its seated viewing-focusing position, tab 132 of ram 102 re-engages the insulative cap of leaf 134 of switch $S_4$. Continued energized rotation of motor 100 causes cam 118 to drive ram 102 further rearwardly while such additional movement at its connection with component 40 is taken up by a lost motion connection within their interconnecting spring drive. Such interconnection is described in detail in U.S. Pat. No. 3,685,416. As the high dwell portion 128 of the control surface of cam 118 moves into contact with follower 126, tab 132 will have driven leaf 134 into contact with leaf 136 and, additionally, will have urged leaf 136 slightly rearwardly. This overtravel of the switch actuating arrangement assures positive closure of switch $S_4$.

Displayed as Event No. 8 in FIGS. 6 and 7 and shown functionally by block 352 in FIG. 4, the initial contact of the leaves 134 and 136 of switch $S_4$ changes the condition of gate input terminal "d" from a "high" to "low" status to, in turn, change output "$t_3$" at line 232 to a "low" status, thereby removing the forward bias at transistors $Q_2$ and $Q_3$ otherwise derived from line 244.

Because the contact between switch $S_4$ leaves 134 and 136 may be unstable when initially made, a condition sometimes referred to as "switch bounce", the earlier described dead zone separation between the energization and de-energization circuit of function 240 and the dynamic brake function thereof assumes particular importance at photographic cycle termination. Accordingly, as output "$t_3$" goes "low", and transistors $Q_2$ and $Q_3$ commence to turn off, the reference voltage derived from forwardly biased transistor $Q_6$ at line 250 asserts a voltage separation assuring that transistor $Q_7$ is not forwardly biased until such time as the output at line 232 drops below a predetermined threshold voltage value. Recall that transistor $Q_6$ is maintained in conduction by the discharge of capacitor 280 and consequent forward biasing of paired transistors $Q_4$ and $Q_5$. This initial dead zone separation is labeled in FIG. 4 between function blocks 352 and 354.

To accommodate for switch bounce, an additional form of dead zone separation, that of a time separation, additionally is present within control function 240. To derive this delay form of dead zone separation, an impedance is provided within the switching elements of the dynamic braking loop. While such impedance may be provided through provision of an inherent impedance within the system, it also may be assured through the use of a selective impedance such as a capacitor shown in phantom at 356 and connected by line 358 between line 288 and ground. Such impedance serves to selectively delay the forward biasing of transistor $Q_8$. Another capacitor shown in phantom at 362 connected within line 364 between line 232 and ground, may be utilized in combination with resistance inherent within the circuit to evolve a ramp voltage buildup at the base of transistors $Q_2$ and $Q_7$ so as to provide a voltage level condition precedent to the forward biasing of those transistors. Any voltage input variations occasioned by switch bounce as witnessed at line 232 would simply be accumulated within the ramp voltage build up while providing requisite time separation between the switching of transistors $Q_2$ and $Q_3$ and transistors $Q_7$ and $Q_8$.

To provide required overtravel movement of ram 102 assuring the full actuation of switch $S_4$, a selective impedance is provided within braking loop 286. As is apparent from FIGS. 2 and 3, excessive rotation of cam 118 while follower 126 is in contact with high dwell portion 128 would result in the failure of camera 10 to properly complete a photographic cycle as well as in the aborting of a next succeeding photographic film unit. It is essential, therefore, that the number of revolutions of the output of motor 100 be accurately controlled following its de-energization.

Figure 8:
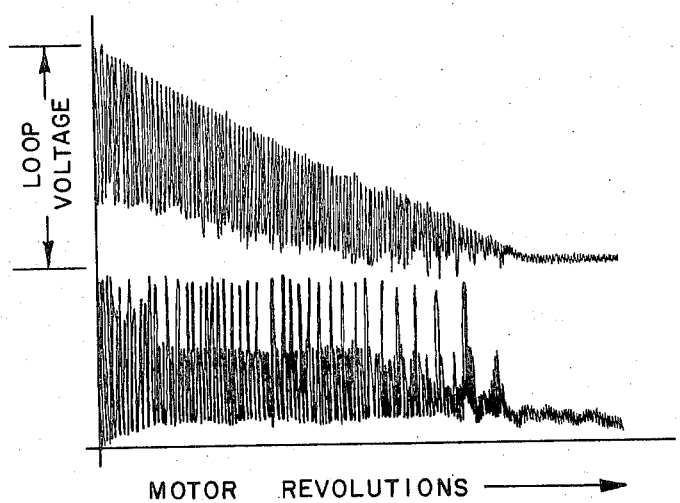
FIG. 8 is a drawing of an oscillotrace comparing motor revolutions with voltages across a motor during a termination of a photographic cycle of the camera of FIG. 1.
Figure 9:
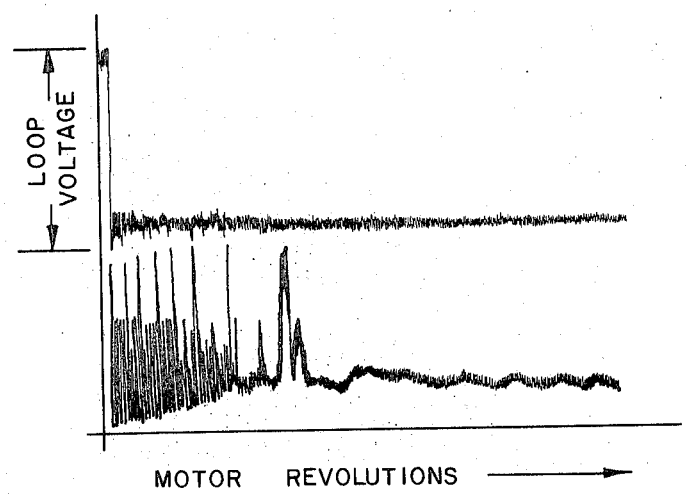
FIG. 9 is a drawing of an oscillotrace comparing motor revolutions and brake loop voltage during a braking sequence of a photographic cycle of the camera of FIG. 1.
Figure 10:
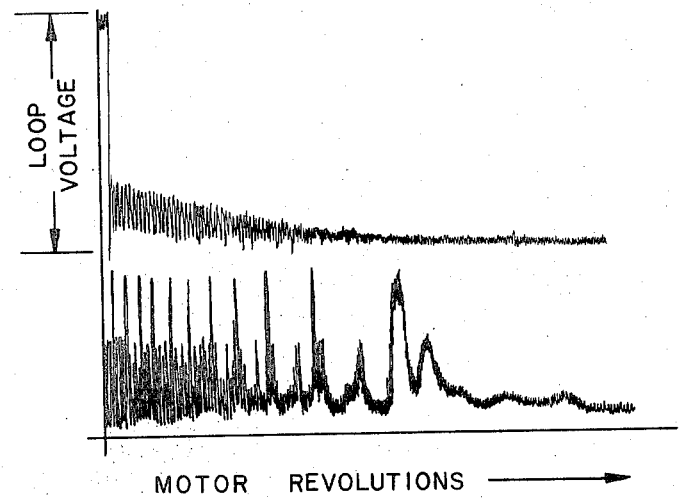
FIG. 10 is a drawing of an oscillotrace comparing motor revolutions and brake loop voltage during a braking sequence of a photographic cycle of the camera of FIG. 1.

Looking to FIG. 8, a drawing of an oscillotrace comparing the voltage across a dynamoelectric motor as at 100 with the number of revolutions which its output shaft evidences in the absence of a braking loop is represented. Each of the spikes shown in the lower portion of the drawing represents a photodetection of one revolution of the output shaft of motor 100. Above these spikes, the voltage across the motor as it reacts as a generator is recorded. Note that under such "coast" conditions, about 40 revolutions of the output shaft are evidenced. Looking to FIG. 9, the same motor was tested in the presence of a braking loop. A mercury relay was provided within the loop to achieve lowest possible impedance across the terminals of the motor. In this instance, the voltage across the motor drops essentially immediately to very low levels, while the number of revolutions, as evidenced by the spikes in the lower portion of the figure, drops to seven. The latter number of revolutions then represents the lowest number available through dynamic braking without imposign a reversing voltage across the motor. Looking now to FIG. 10, an intermediate situation is presented as a one ohm resistance has been inserted in the braking loop across the motor to reveal a performance providing ten revolutions and an intermediate series of voltage values decaying to zero with the final tenth revolution.

Returning to FIGS. 4 and 5, following the imposition of a dead zone separation at the completion of motor de-energization, brake loop 286 is activated, as described at function block 354, for a period of time sufficient to derive a predetermined number of braking rotational cycles of motor 100. As discussed in connection with FIGS. 8–10, the number of revolutions made by the shaft of motor 100 may be regulated by selecting an impedance for insertion within loop 286. Such impedance may be discretely inserted by a resistive component such as that at 360 shown in phantom before transistor $Q_8$. Alternately, the saturation resistance of transistor $Q_8$ may be selected so as to provide a predetermined impedance, for instance one-half ohm. With the latter arrangement, insertion of an extra resistive component is unnecessary. As the output shaft of motor 100 halts following a regulated number of rotations under dynamic braking, a photographic cycle is terminated as indicated at block 366 in FIG. 4.

The general circuitry is shut down with the closure of switch $S_4$. For instance, the switch serves to impose a quenching signal to latching function 166 from along lines 238, 236, resistor 292, line 236 and line 294. This de-energization permits exposure mechanism blades 60 and 62 to be driven under the bias of spring 78 to their fully open position in preparation for a next proceeding photographic cycle. As blades 60 and 62 commence to open, switch $S_2$ opens to establish the "off" condition shown at Event No. 9 of FIGS. 6 and 7.

Figure 11:
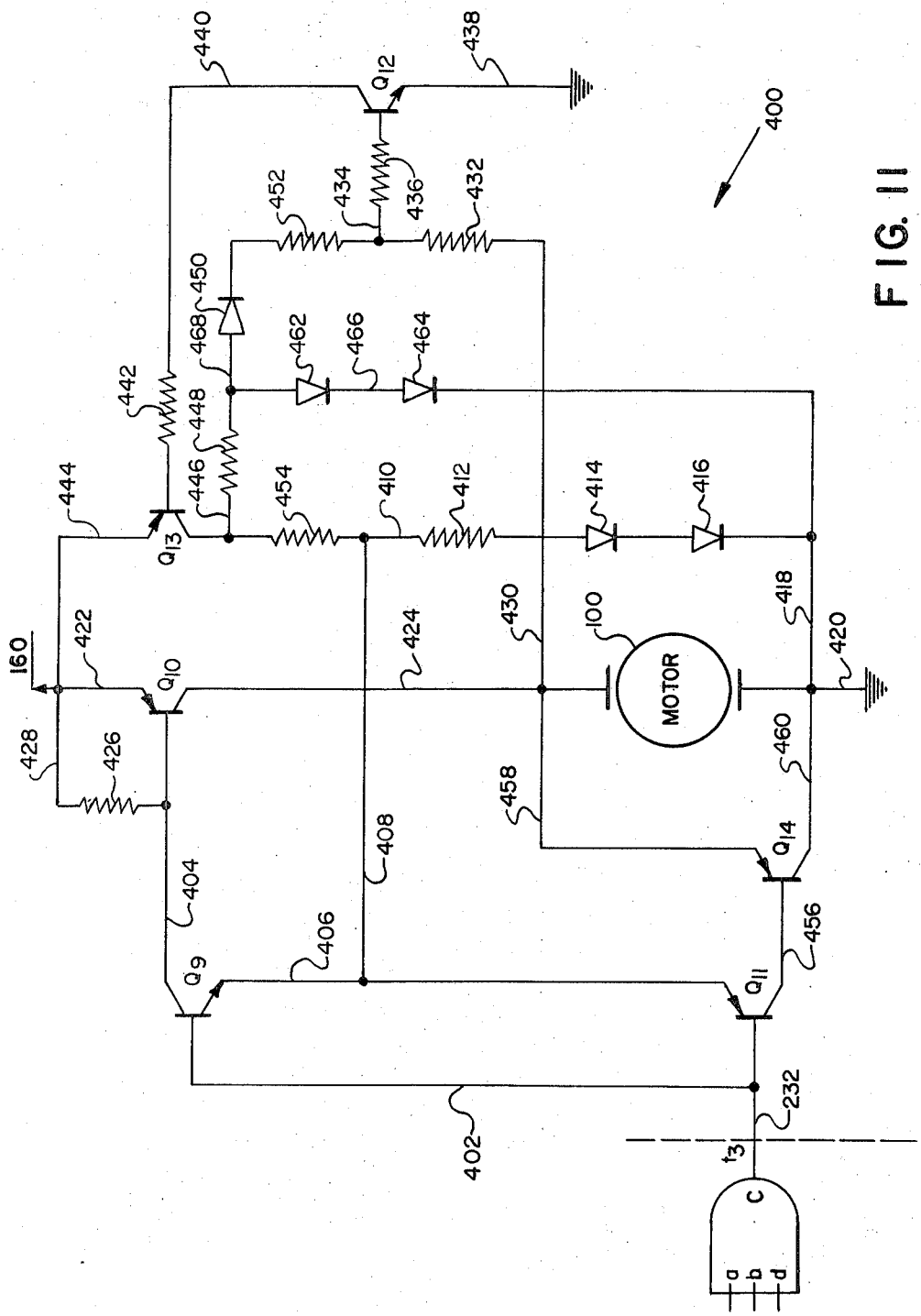
FIG. 11 is a schematic diagram of an alternate embodiment for a dynamic braking circuit operative with the control circuit of FIG. 5.

Referring to FIG. 11, an alternate embodiment for motor control function 240 is shown generally at 400. While providing the same dual form of dead zone separation of motor energization and de-energization switching from activation of the motor braking loop, this motor control circuit maintains motor brake loop activation through the use of a network serving to sense the predetermined voltage decay witnessed across the motor as discussed above in connection with FIGS. 8–10.

Similar to the embodiment of FIG. 5, a "high" output "$t_3$" at line 232 of GATE C serves to forward bias the base-emitter junction of an NPN transistor $Q_9$. Note in this regard that the base electrode of transistor $Q_9$ is connected with output line 232 by line 402, while its collector is connected along line 404 to the base of a PNP transistor $Q_{10}$. The emitter of transistor $Q_9$ is connected by line 406 to the emitter of a PNP transistor $Q_{11}$. Inasmuch as the base of transistor $Q_{11}$ is coupled with output line 232, transistor $Q_{11}$ remains reverse biased while transistor $Q_9$ is on. Line 406 is connected through level adjusting line 408, line 410, resistor 412, diodes 414 and 416, line 418 and line 420 to ground. Accordingly, as the base-emitter junction of transistor $Q_9$ conducts, transistor $Q_{10}$ is drawn on to energize motor 100 from line 422, connected between power line 160 and the emitter thereof, and line 424 connecting motor 100 between the collector of transistor $Q_{10}$ and ground. A resistor 426 connected in line 428 between line 404 and line 422 is present to enhance the turn-off characteristics of transistor $Q_{10}$.

As voltage is applied to motor 100 from line 424, it is additionally witnessed at line 430, resistor 432, line 434 and bias resistor 436 to, in turn, forward bias the base-emitter junction of an NPN transistor $Q_{12}$. The emitter of transistor $Q_{12}$ is connected through line 438 to ground, while its collector is coupled through line 440 and resistor 442 to the base of a PNP transistor $Q_{13}$. The emitter of transistor $Q_{13}$ is coupled by line 444 to power line 160 through line 442, while its collector is connected to lines 410 and 446, resistor 448, diode 450, resistor 452, line 434 and resistor 436 to the base of transistor $Q_{12}$. Accordingly, transistors $Q_{12}$ and $Q_{13}$ are coupled within a latching network, transistor $Q_{12}$ being latched on through the above-identified circuit path.

When output "$t_3$" of GATE C converts to a "low" state, the forward bias of transistors $Q_9$ and $Q_{10}$ is removed as in the embodiment of FIG. 5 and transistor $Q_{11}$ is drawn to a forwardly biased state. Note, as before, that level adjusting line 408, operating in conjunction with resistors 454 and 412 within line 410 as well as diodes 414 and 416, serves to impose a voltage separation between the operation of transistors $Q_9$ and $Q_{11}$. Accordingly, transistor $Q_{11}$ will not turn on until such time as the voltage at line 232 drops below a predetermined threshold value. The collector of transistor $Q_{11}$ is connected through line 456 to the base of a PNP transistor $Q_{14}$. Transistor $Q_{14}$ represents the final switching component within the dynamic brake loop including line 458 coupled between the plus side of motor 100, the emitter of transistor $Q_{14}$ and line 460 connected between the grounded terminal of motor 100 and the collector of transistor $Q_{14}$.

With the forward biasing of transistor $Q_{11}$ and consequent turning on of transistor $Q_{14}$, the above-noted loop circuit including lines 458 and 460 is activated to commence dynamic braking. As described in connection with the transistor $Q_8$ of FIG. 5, transistor $Q_{14}$ is selected having a predetermined saturation resistance to impose a predetermined impedance within the braking loop to control the number of post de-energization rotational cycles of motor 100. As motor 100 is braked, the voltage thereacross commences to decay and a sensing network coupled with line 430 witnesses and reacts to this decay. The sensing network comprises diode 450, resistors 452 and 432 working in conjunction with a reference voltage established by resistor 448 and diodes 462 and 464 positioned within line 466. The reference point of the sensing network, present at 468 is held at a given voltage value during active braking. Resistors 452 and 432 are balance or divider resistors, resistor 432 following the voltage drop at line 430. As the voltage witnessed at motor 100 and line 430 decays, the voltage value at resistor 432 follows it and the balance relationship between resistors 432 and 452 varies such that the forward bias imposed at the base-emitter junction of transistor $Q_{12}$ is gradually removed. In consequence, the amount of forward bias at transistor $Q_{13}$ diminishes to the extent that drive current from transistor $Q_{13}$, as directed through lines 408 and 406, is diminished such that transistor $Q_{11}$ eventually is turned off at a select low voltage level.

In view of the limited power supply of the thin, compact cameras within which the instant braking techniques are incorporated, it is essential that battery leakage through the circuit during periods of non-use or storage be carefully restricted. Note that motor control function 240 is not de-energized by the simple expedient of opening a mechanical switch or the like. The function continues to be powered from battery 162 for a select period of time following the last actuation of a switch at the mechanical-electrical interface of the control system of the camera.

Accordingly, following the braking of motor 100, battery leakage is limited to acceptable levels in consequence of the reverse biased states and arrangement of those elements confronting line 264. Note, for instance, in FIG. 5, that current input from line 264 is fully blocked by the transistor collector-base junctions of transistors $Q_2$, $Q_3$, $Q_6$, $Q_4$ and $Q_5$.

Similarly, in FIG. 11, current input from line 160 is blocked at the collector-base junctions of transistors $Q_9$, $Q_{10}$, $Q_{13}$ and $Q_{12}$.

Since certain changes may be made in the above-described apparatus without departing from the scope of the invention herein involved, it is intended that all matter contained in the description thereof as shown in the accompanying drawings shall be interpreted as illustrative and not in a limiting sense.

I claim:

1. A control system for photographic apparatus of a variety having instrumentalities selectively actuable in the course of carrying out operational events of a photographic cycle comprising:
   electric motor means energizable from a source of electricity to develop a rotational drive output;
   mechanical control means movable in response to said motor means output and including mechanical cycle logic means movable to predetermined positions in the course of said photographic cycle to effect the initiation and termination of select ones of said events;
   control circuit means for controlling said actuation of said instrumentalities and including:
   logic means having first and second output conditions and responsive to said mechanical cycle logic means reaching select ones of said predetermined positions for developing said second output condition, and
   circuit means responsive to said first output condition for energizing said electric motor means to effect said movement of said cycle logic means and responsive to said second output condition for de-energizing and dynamically braking said electric motor means, said circuit means further being configured to effect a dead zone separation between said de-energization and said dynamic braking.

2. The control system of claim 1 in which said circuit means includes brake switching circuit means including means defining a dynamic braking loop for dynamic braking of said motor means to selectively regulate the extent of rotation of said drive output following said de-energization.

3. The control system of claim 2 in which said brake switching circuit means is configured and arranged to exhibit an impedance within said braking loop selected to derive said regulation of the extent of rotation of said drive output.

4. The control system of claim 2 in which said circuit means includes energizing means for activating said brake switching circuit means from said source to derive said regulated extent of rotation of said motor means drive output.

5. The control system of claim 4 in which said energizing means includes energy storage means for storing electrical energy from said source while said electric motor means is energized and means responsive to the discharge of said energy for activating said energizing means during said dynamic braking of said motor means.

6. The control system of claim 4 in which:
   said dynamic braking loop is configured to exhibit a predetermined voltage decay characteristic when said motor means is dynamically braked; and
   wherein said energizing means includes sensing network means responsive to said voltage decay reaching a predetermined level for effecting the de-activation of said brake switching circuit means following said regulated extent of rotation of said motor means drive output.

7. The control system of claim 4 in which:
   said dynamic braking loop is configured to exhibit a voltage having a perdetermined decay characteristic when said motor means is dynamically braked; and
   wherein said energizing means includes activator means for activating said brake switching circuit means, and sensing network means responsive to the presence of said voltage above a predetermined level for activating said activator means.

8. A control system for photographic apparatus comprising:
instrumentality means actuable to carry out operational events of a photographic cycle;
electric motor means energizable to provide a rotating drive output;
mechanical control means responsive to said rotating drive output for causing said instrumentality means to carry out select ones of said operational events; and
control means for selectively energizing, subsequently de-energizing, and dynamically braking said electric motor means, said control means being configured and arranged to effect a dead zone separation between said de-energization and said dynamic braking.

9. The control system of claim 8 in which said control means includes:
a first switching circuit for energizing and de-energizing said electric motor means;
a second switching circuit including a dynamic braking loop, actuable to effect said dynamic braking; and
means selectively delaying said second switching circuit actuation so as to prevent energization of said motor means through said first switching circuit and simultaneous actuation of said second switching circuit.

10. The control system of claim 9 in which said dynamic braking loop is configured to exhibit a predetermined voltage decay characteristic when actuated to brake said electric motor means; and
said second switching circuit further includes sensing network means responsive to said voltage decay reaching a predetermined level for de-activating said braking loop at the termination of a said photographic cycle.

11. The control system of claim 8 in which said control means includes:
first switching circuit means for energizing and de-energizing said electric motor means;
second switching circuit means energizable to activate a dynamic braking loop; and
energy storage means for selectively energizing said second switching circuit means when said first switching circuit means de-energizes said motor means.

12. The control system of claim 11 in which said energy storage means is configured to store energy from a power source while said electric motor means is energized.

13. The control system of claim 8 in which said control means includes:
logic means having a first output signal of one voltage level for energizing said motor means and another voltage level for de-energizing said motor means;
first switching circuit means including first solid state switch means responsive to said logic means output signal achieving said one voltage level for energizing said motor means and responsive to said output signal falling below said one level for de-energizing said motor means; and
second switching circuit means including second solid state switch means responsive to said logic means output signal falling to said other level for dynamically braking said motor means.

14. The control system of claim 13 in which said control means includes reference means for interposing a voltage intermediate said first and second solid state switch means having a level selected to establish a said dead zone separation therebetween.

15. In a photographic control system of a variety having an electric motor and control logic means deriving one output signal for energizing said motor from a source of electricity and another output signal for de-energizing said motor, and improved motor control circuit comprising:
first circuit means including first solid state switching means responsive to said one output signal for energizing said motor from said source and to said other output signal for de-energizing said motor; and
second circuit means including second solid state switch means responsive to said other output signal for dynamically braking said motor and including a dynamic braking loop connected across said motor and exhibiting a predetermined impedance selected to effect a select number of revolutions of said motor when dynamically braked.

16. The photographic control system of claim 15 in which said second circuit means includes energizing means for activating said second solid state switching means from said source of electricity when said motor is dynamically braked.

17. The photographic control system of claim 16 in which:
said dynamic brake loop is configured to exhibit a predetermined voltage decay characteristic when said motor is dynamically braked; and
said energizing means includes sensing network means responsive to said voltage decay reaching a predetermined level for de-activating said second switching circuit means.

18. The photographic control system of claim 16 in which said energizing means includes:
third solid state switching means operative when activated to activate said second solid state switching means; and
energy storage means for storing electrical energy from said source while said electric motor means is energized and for activating said third solid state switching means while said motor is dynamically braked.

19. The photographic control system of claim 15 wherein said first circuit means and said second circuit means are configured and arranged to effect a dead zone separation therebetween intermediate said de-energization and said dynamic braking of said electric motor.

20. The photographic control system of claim 19 wherein said second circuit means includes means for selectively delaying activation of said second solid state switch means so as to avoid energization of said motor by said first circuit means and simultaneous activation of said second solid state switch means.

21. The photographic control system of claim 15 including reference network means for asserting a voltage intermediate said first and second solid state switch means having a level selected to establish a dead zone separation therebetween.

22. A control system for photographic apparatus of a variety having instrumentalities selectively actuable in the course of carrying out operational events of a photographic cycle comprising:
electric motor means energizable from a source of electricity to develop a rotational drive output;
mechanical control means movable in response to said motor means output and including mechanical cycle logic means movable to predetermined positions in the course of said photographic cycle to effect the initiation and termination of select ones of said events;
control circuit means for controlling said actuation of said instrumentalities and including:
logic means actuable in response to said mechanical cycle logic means reaching select ones of said predetermined positions for developing a select output condition, and
circuit means for selectively energizing said electric motor means to effect said movement of said cycle logic means and responsive to said select output condition for de-energizing said motor means, said circuit means including brake switching circuit means having means defining a dynamic braking loop for dynamically braking said motor means to selectively regulate the extent of rotation of said drive output following said de-energization, and energizing means for activating said brake switching circuit means from said source.

23. The control system of claim 22 in which said energizing means includes energy storage means for storing electrical energy from said source while said electric motor means is energized and means responsive to the discharge of said energy for activating said energizing means during said dynamic braking of said motor means.

24. The control system of claim 22 in which:
said dynamic braking loop is configured to exhibit a predetermined voltage decay characteristic when said motor means is dynamically braked; and
wherein said energizing means includes sensing network means responsive to said voltage decay reaching a predetermined level for effecting the deactivation of said brake switching circuit means following said regulated extent of rotation of said motor means drive output.

25. The control system of claim 22 in which:
said dynamic braking loop is configured to exhibit a voltage having a predetermined decay characteristic when said motor means is dynamically braked; and
wherein said energizing means includes activator means for activating said brake switching circuit means, and sensing network means responsive to the presence of said voltage above a predetermined level for activating said activator means.

26. A photographic system comprising:
lens means;
means for mounting a film unit for exposure to light entering said camera through said lens means;
means for receiving a source of electrical energy;
an operator mechanism;
a light reflective element mounted for selective displacement between a position wherein it precludes light rays entering said photographic system through said lens means for exposing the film unit and a second position wherein it does not preclude light rays entering said photographic system through said lens means from exposing the film unit;
means responsive to the movement of said operator mechanism for performing at least one operational event of a photographic cycle, said one operational event including the displacement of said light reflecting element from its said first position into its said second position;
an electric motor having a mechanical drive output;
a motor dynamic braking circuit;
means coupling said mechanical drive output of said electric motor to said operator mechanism; and
electrically operable control means for electrically coupling said electric motor to the source of electrical energy to effect the displacement of said light reflecting element from its said first position into its said second position, for then disconnecting said electric motor from the source of electrical energy and completing an electrical circuit between said electric motor and said motor braking circuit to dynamically brake said electric motor, the electrical impedance in said braking circuit being selected to terminate the movement of said operator mechanism before it can again initiate the performance of an operational event of said photographic cycle.

27. The photographic system of claim 26 wherein said means for performing at least one operational event of a photographic cycle responsive to the movement of said operator mechanism additionally performs another operational event including the return of said light reflecting element from its said second position into its said first position following the exposure of the film unit and said electrically operable control means additionally includes means for coupling said electric motor to the source of electrical energy after the exposure of the film unit to effect the return of said light reflecting element into its said first position, then disconnecting said electrical motor from the source of electrical energy and again completing said electrical circuit between said electric motor and said motor braking circuit to dynamically brake said electric motor.

28. A photographic system comprising:
means for receiving a source of electrical energy;
an operator mechanism arranged for movement away from an initial position and then back into its said initial position;
means responsive to said movement of said operator mechanism for sequentially performing a plurality of operational events of a photographic cycle;
an electric motor having a mechanical drive output;
a motor dynamic braking circuit;
means coupling said mechanical drive output of said electric motor to said operator mechanism; and
electrically operable control means for sequentially electrically coupling said electric motor to the source of electrical energy to effect the performance of an initial of said operational events of said photographic cycle as said operator mechanism moves away from its said initial position, for disconnecting said electric motor from the source of electrical energy, completing an electrical circuit between said source and said motor braking circuit to dynamically brake said motor, disrupting the operative braking association between said electric motor and said motor braking circuit, coupling said electric motor to the source of electrical energy to effect the performance of another of said operational events as said operator mechanism is returned into tis said initial position and again completing said electrical circuit between said electric motor and said motor braking circuit to dynamically brake said electric motor, the electrical impedance in said braking circuit being selected to terminate the movement of said operator mechanism subsequent to the performance of each said operational event and before it can initiate the performance of the next said operational event.

* * * * *